Feb. 3, 1959 O. H. HASTINGS 2,871,931
VEHICLE COVER-ALL ASSEMBLY
Filed July 25, 1956
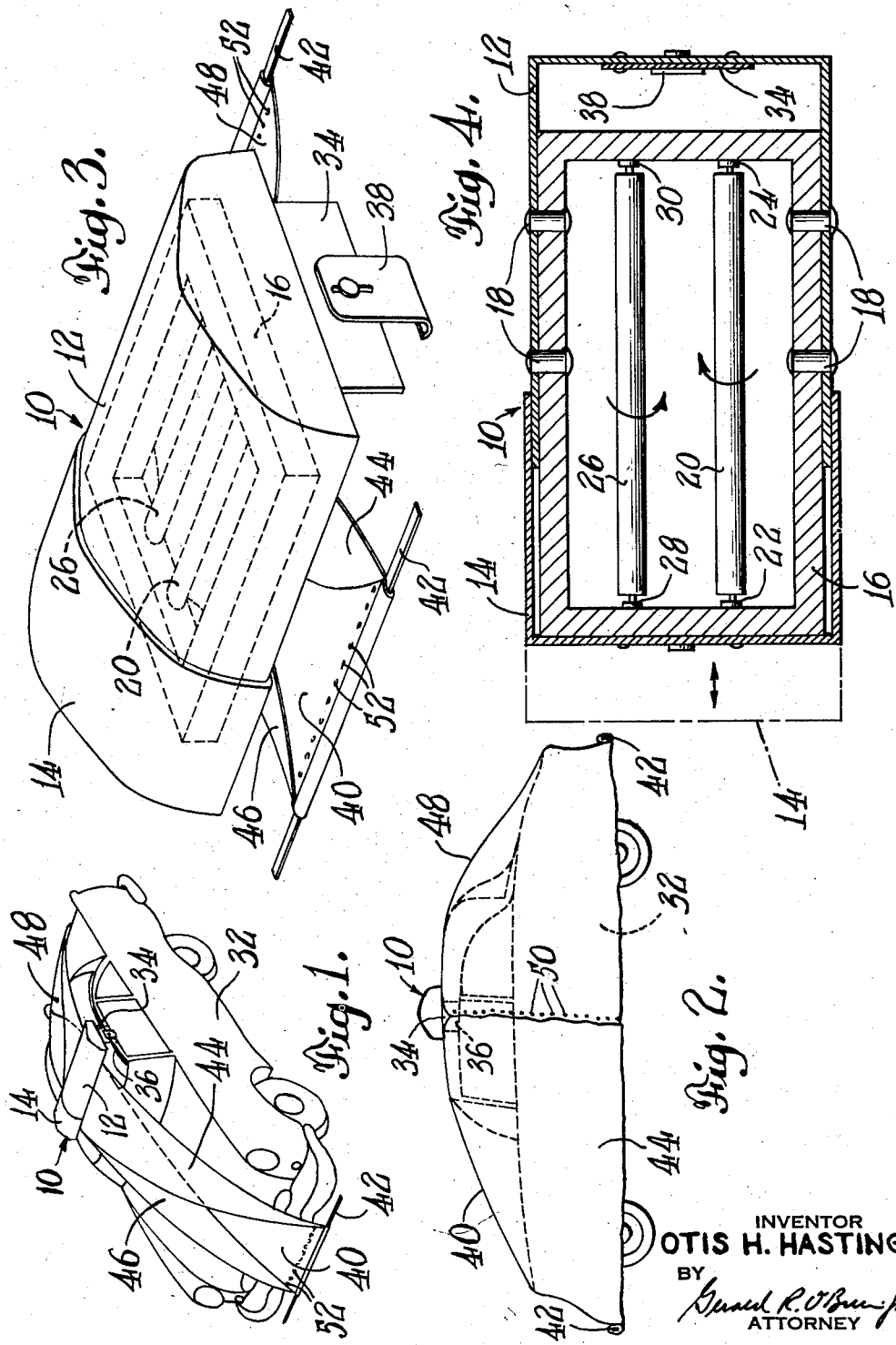
INVENTOR
OTIS H. HASTINGS
BY
ATTORNEY

United States Patent Office 2,871,931
Patented Feb. 3, 1959

2,871,931

VEHICLE COVER-ALL ASSEMBLY

Otis H. Hastings, Ramsey, N. J.

Application July 25, 1956, Serial No. 600,119

1 Claim. (Cl. 160—21)

The present invention relates to a vehicle cover-all assembly and, more particularly, to means capable of providing covering material which can be withdrawn therefrom to cover the body of vehicles, such as automobiles, trucks and the like.

Heretofore, vehicle covering means capable of easy and compact storage within the vehicle has not been available. Additionally, prior vehicle covering means had the disadvantage of being very difficult if not impossible to manipulate by a single person.

It is, therefore, the main object of the present invention to provide a vehicle cover-all assembly which is simple and rugged in construction, is capable of easy and compact storage within the vehicle, and which requires no more than one person for operation.

Other aims and advantages of the invention will be apparent from the following description and appended claims.

In accordance with the present invention, a vehicle cover-all assembly is provided comprising an outer container; means for mounting the container transversely across the roof of a vehicle; first roller means positioned at the front side of the container and supporting a roll of first folded vehicle covering material shaped to cover the forward portion of the vehicle when drawn from the roll and unfolded; and second roller means positioned in the rear of the container and supporting a roll of second folded vehicle covering material shaped to cover the rear portion of the vehicle when drawn from the roll and unfolded.

In the drawing:

Fig. 1 is a perspective view of a vehicle having mounted on the roof thereof a vehicle cover-all assembly embodying the invention, and showing the folded covering material drawn from the container means in the front and rear;

Fig. 2 is a side elevational view of the vehicle provided with the cover-all assembly of Fig. 1, showing the covering material fully withdrawn from the container means and unfolded to cover the upper portion of the vehicle;

Fig. 3 is a perspective view of a vehicle cover-all assembly embodying the invention; and Fig. 4 is a horizontal sectional view of the container means of Fig. 3 showing the internal construction.

Referring specifically to the embodiment of the drawing, a hollow container 10 is provided having two relatively sliding members 12 and 14 of sheet metal, wood, or the like. Member 12 is secured to rectangular frame member 16 of metal, wood, or the like, by means of rivets or screws 18. In this manner, container 10 can be reduced in size for ease in storage by the telescoping of relatively sliding members 12 and 14.

First roller means is provided at the forward end of frame member 16 and comprises roller 20 rotatably mounted at pivots 22 and 24 and containing internal helical spring loading means of the type employed in common window shade rolls. Similarly, second roller means is provided at the rear end of frame member 16 and comprises roller 26 rotatably mounted at pivots 28 and 30.

The second roller means is mounted to permit rotation in the opposite direction from that of rotation of the first roller means, in the manner shown by the arrows in Fig. 4 of the drawing.

Rollers 20 and 26 support rolls of folded vehicle covering material, such as plastic sheeting, canvas, or other suitable covering fabric, which can be drawn from and rewound into rolls on the rollers. The vehicle covering material is cut and shaped so that, upon being drawn from the roller and unfolded, it will cover, and preferably closely contour, a portion of the vehicle. Two rolls of folded vehicle covering material are mounted on rollers 20 and 26, respectively, and, when they are both withdrawn from the container 10 and unfolded, are shaped to cooperate to cover the entire vehicle.

The procedure for operation of the cover-all assembly of the drawing to cover a vehicle is as follows:

The cover-all assembly is removed from the trunk of the vehicle, or other place of storage, and mounted on the top of the vehicle 32 in the manner shown in Fig. 1 of the drawing. This is accomplished by extending telescoping members 12 and 14 to the proper distance to permit supporting members 34, positioned at opposite sides of container 10, to register in and be supported by the grooves 36 provided along the sides of vehicle roofs. Gripping means 38 are then tightened to secure the assembly to the vehicle.

Forward folded vehicle covering material 40 is then withdrawn from the container with the aid of rod 42 to the length shown in Fig. 1 of the drawing. The two side flap portions of this material 44 and 46 are then unfolded down to cover the front sides of the vehicle, as shown in Fig. 2. Outer corners of the folded material are provided with flaps which permit covering the portion of the side of the vehicle under the overhang of the container 10.

The rear folded vehicle covering material 48 is withdrawn from the container and unfolded to cover the rear portion of the vehicle in a similar manner. Suitable snap or zipper means 50 are provided along the cooperating edges of the forward and rear portions of vehicle covering material to permit securing one edge to the other. In addition, small permanent magnets 52 or the like may be provided about the lower edges of both the forward and rear portions of covering material to secure the edges to the lower portions of the vehicle.

What is claimed is:

In an automobile cover-all assembly which comprises a housing adapted to be attached to an automobile top, exit means forward and aft positioned in said housing, covering material carried by rollers and drawn outwardly through said exit means to cover respective portions of the vehicle; the improvement comprising a frame, the covering material supporting rollers journalled in said frame, an elongated outer container comprising two axially telescoping portions; depending supports carried at the outer ends of the respective telescoping housing portions adapted to engage the longitudinal edges of a vehicle to which the cover-all assembly is adapted to be mounted; said frame member positioned in said container and permanently secured to one only of said telescoping portions; whereby said assembly is adapted to fit vehicle tops of varying widths, maintaining the mounting of the covering material supporting rollers intact in the telescoping portion to which the frame is permanently attached.

References Cited in the file of this patent

UNITED STATES PATENTS

| 767,644 | Hutchison | Aug. 16, 1904 |
| 1,210,012 | Snell | Dec. 26, 1916 |
| 1,789,764 | McAnaney | Jan. 20, 1931 |
| 1,999,171 | Bryant | Apr. 30, 1935 |